United States Patent [19]

Buchheit

[11] 4,299,499

[45] Nov. 10, 1981

[54] THROTTLE DEVICE FOR A TWIN-SHAFTED SCREW MACHINE

[75] Inventor: Dieter H. Buchheit, Nussdorf, Fed. Rep. of Germany

[73] Assignee: Werner & Pfleiderer, Stuttgart, Fed. Rep. of Germany

[21] Appl. No.: 154,089

[22] Filed: May 28, 1980

[30] Foreign Application Priority Data

Jun. 20, 1979 [DE] Fed. Rep. of Germany ....... 2924800

[51] Int. Cl.³ ........................... B29B 1/10; B01F 7/08
[52] U.S. Cl. ........................................ 366/85; 366/301
[58] Field of Search ..................... 366/79, 83, 84, 85, 366/97, 301, 318; 425/204, 207, 208; 100/148

[56] References Cited

U.S. PATENT DOCUMENTS

| | | | |
|---|---|---|---|
| 2,814,472 | 11/1957 | Erdmenger | 366/97 |
| 3,518,936 | 7/1970 | Bredeson | 100/148 X |
| 3,704,972 | 12/1972 | Kneller et al. | 366/79 X |
| 3,780,994 | 12/1973 | Kneller et al. | 366/76 |
| 3,883,122 | 5/1975 | Werner | 366/85 |
| 3,968,955 | 7/1976 | Fritsch | 366/79 |

FOREIGN PATENT DOCUMENTS 1040956 9/1966 United Kingdom ............... 425/208

Primary Examiner—Philip R. Coe
Attorney, Agent, or Firm—Browdy and Neimark

[57] ABSTRACT

A throttle device for a twin-shaft screw machine having a housing with two mutually penetrating bores in which respective screw shafts are arranged. Each bore has an outer gap sleeve and each shaft has an inner gap sleeve, the sleeves being mutually axially displaceable in order to generate or modify a throttle gap therebetween. The throttle gaps are formed, in each case, between cylindrical outer circumference on the respective inner gap sleeve and a cylindrical internal bore on the respective outer gap sleeve to provide an annular cylindrical gap of constant width but variable length. Each outer gap sleeve is connected to at least one sliding bolt which passes through an associated slot in the housing and through which the outer gap sleeve can be moved axially from outside the housing.

13 Claims, 9 Drawing Figures

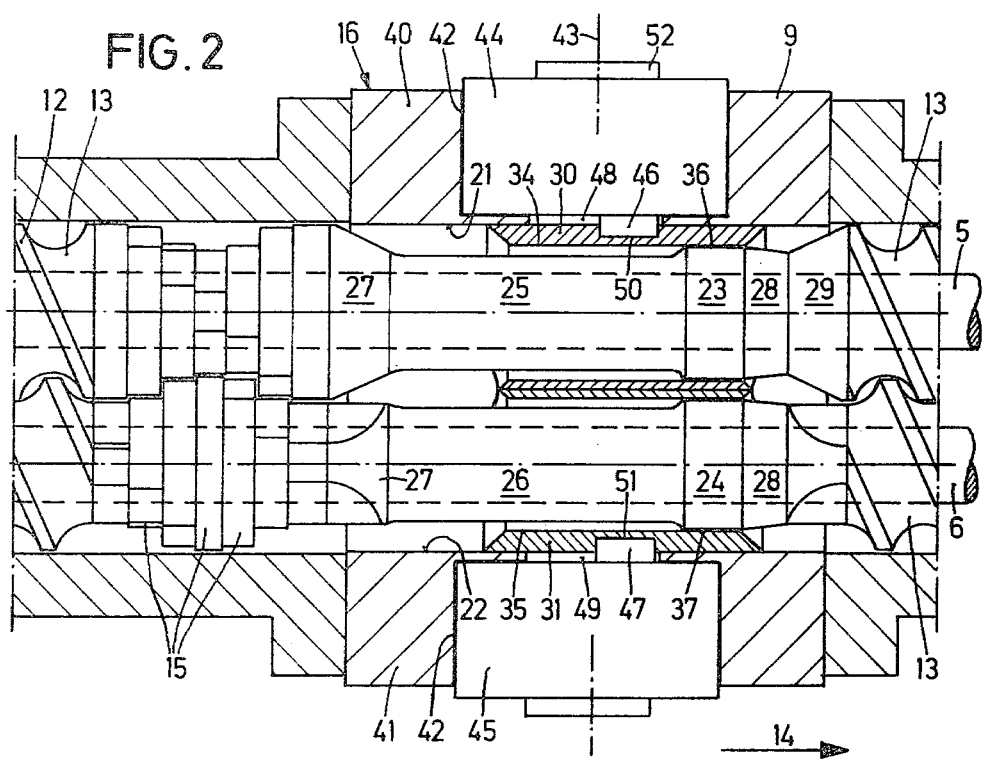
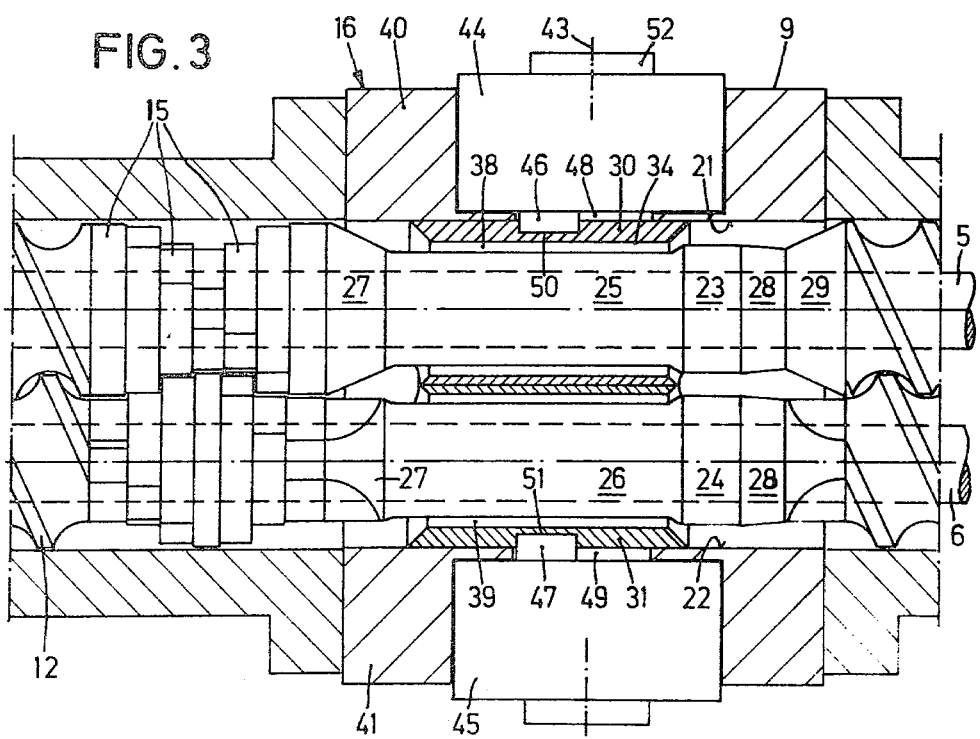

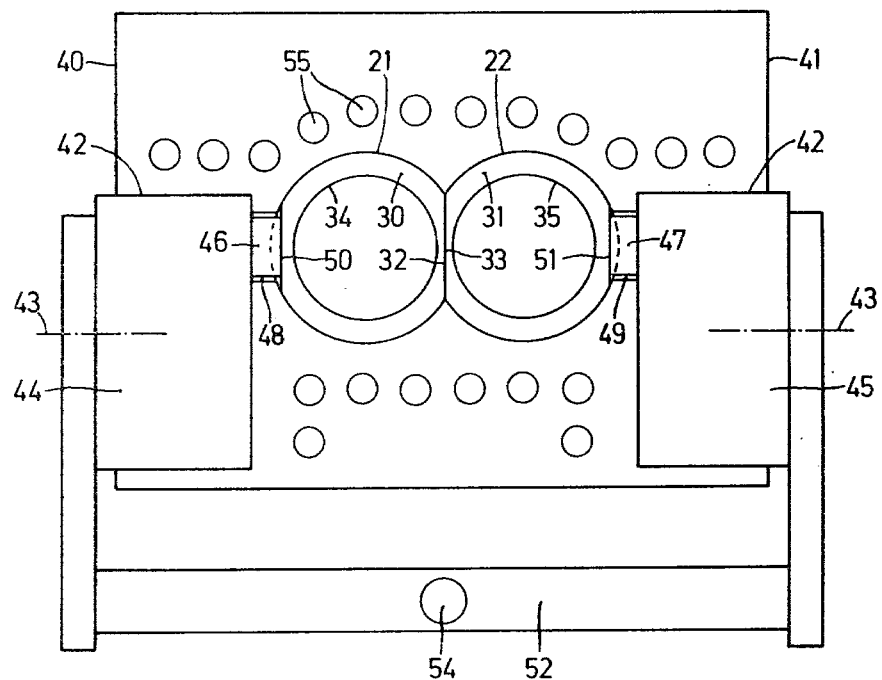

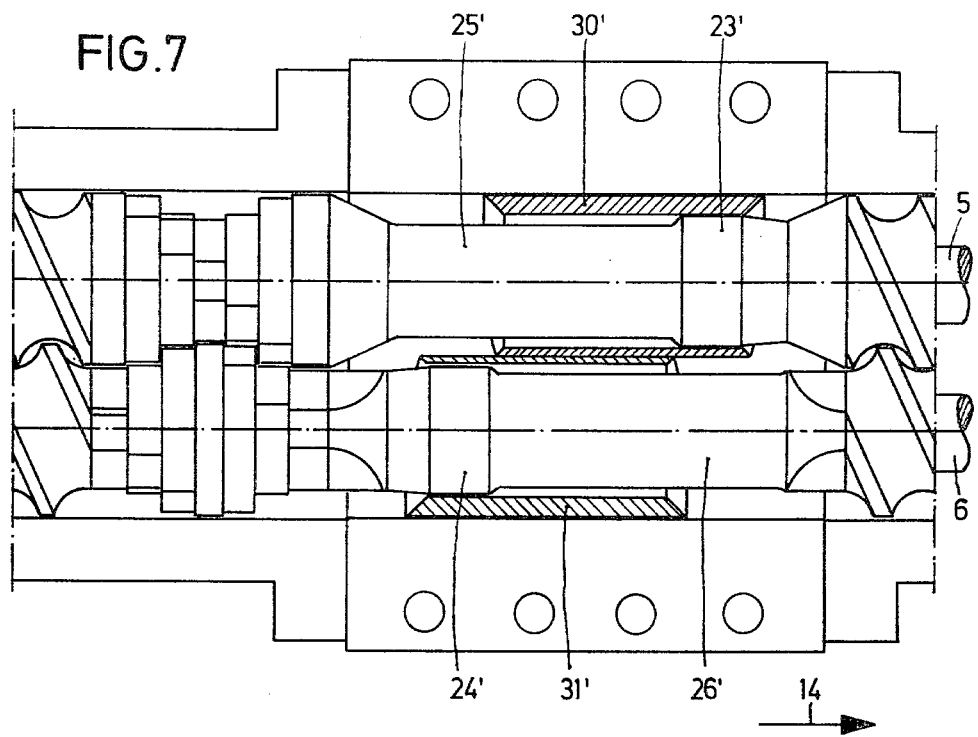
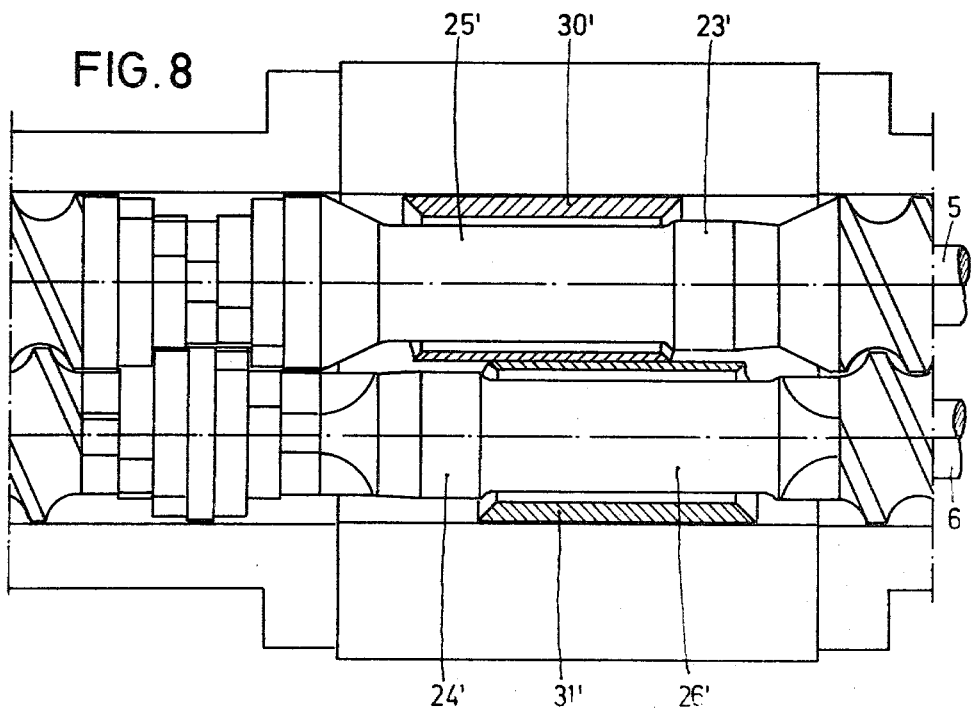

THROTTLE DEVICE FOR A TWIN-SHAFTED SCREW MACHINE

BACKGROUND OF THE INVENTION

The invention relates to a throttle device for a twin-shafted screw machine having a housing with two mutually penetrating housing bores in which respective screw shafts having mutually meshing screw elements are arranged, each housing bore having a outer gap sleeve substantially tightly abutting the wall of the housing bore, and each screw shaft having an associated inner gap sleeve, the inner and outer gap sleeves being mutually axially displaceable in order to generate or to modify a gap therebetween for throttling the material to be processed, the outer gap sleeves being guided to prevent relative rotation therebetween. Such throttle devices are hereinafter referred to as *throttle devices of the type referred to.*

In one such throttle device of the type referred to, which is known from German Federal Republic Offenlegungsschrift (Laid Open Patent Application) No. 23 21 325, the surfaces delimiting the gap on the outer gap sleeves and the inner gap sleeves are conical, so that a gap width adjustment is effected by a slight relative axial displacement of said sleeves. The outer gap sleeves are mounted firmly in the relevant housing bore. The gap width adjustment occurs in that, the screw shaft being firmly held, the housing is displaced slightly axially, or the housing being firmly held, the screw shaft is displaced slightly axially. This mode of gap width adjustment produces great disproportionalities between the adjustment stroke on the one hand and the increase in counter-pressure in the material to be treated, which is of course essential to the shearing effect in the gap.

A throttle device for a single-shafted screw machine is known from U.S. Pat. No. 3,780,994, wherein there is mounted on the screw shaft an inner gap sleeve with a circular cylindrical outer circumference, with which there is associated an outer gap sleeve with a circular cylindrical internal bore which is slidable axially in the housing bore by being slid by means of a screw-threaded transmission. For a single-shafted screw machine this throttle device already achieves the advantage that proportionality is obtained between the adjustment stroke and the counterpressure variation in the material to be treated. Such a throttle gap infinitely adjustable in length therefore has a linear throttle characteristic. The disadvantage of this construction lies in the fact that it is unsuitable for multiple-shafted machines, and that the housing bore requires an enlarged cross-section in the region of the throttle device.

SUMMARY OF THE INVENTION

It is therefore the underlying aim of the invention to develop a throttle device of the type referred to so that the advantages of an axially infinitely adjustable throttle gap of constant gap width are obtained by structurally simple means.

According to the present invention there is provided a throttle device for a twin-shafted screw machine having a housing with two mutually penetrating housing bores in which respective screw shafts having mutually meshing screw elements are arranged, each housing bore having an outer gap sleeve substantially tightly abutting the wall of the housing bore, and each screw shaft having an associated inner gap sleeve, the inner and outer gap sleeves being mutually axially displaceable in order to generate or to modify a gap therebetween for throttling the material to be processed, the outer gap sleeves being guided to prevent relative rotation therebetween, wherein each gap is formed between a circular cylindrical outer circumference on the inner gap sleeve and a circular cylindrical internal bore on the associated outer gap sleeve so that each gap comprises an annular cylindrical gap of constant width but variable length, each outer gap sleeve being connected to at least one sliding bolt which extends through an associated slot in the housing and is movable from the exterior of the housing.

The simple drive of the outer gap sleeves mounted slidably in the housing bores permits the building up of throttle gaps of comparatively great axial extension, the length of which is very finely infinitely adjustable between a maximum value and the value zero, whereby the throttle characteristic can also be made extremely fine. With this mode of development the relevant housing bore can be kept cylindrical throughout, whilst the outer gap sleeves abut with only the play necessary for the sliding i.e. as a close sliding fit, so that no dead corners whatsoever, in which material can settle, are formed. Due to the configuration the gap sleeves can be also lined with a wear-resistant lining in a simple manner.

Preferably, the sliding bolts are mutually kinematically coupled and each bolt may be attached to a disc which also masks the associated slot. The discs may be of circular cylindrical construction mounted in corresponding depressions in the housing.

In one preferred embodiment, one sliding bolt, which penetrates an associated lateral wall of the housing, is associated with each outer gap sleeve. In another preferred embodiment two mutually opposite sliding bolts penetrating the top side and the underside of the housing respectively are associated with each outer gal sleeve. In this case, the two sliding bolts penetrating the top side of the housing on the one hand and the two sliding bolts penetrating the underside of the housing may be coupled mutually integrally in rotation and are pivotable about a common median axis.

Alternatively, the two sliding bolts may, in each case, be pivotable in mutually opposite directions of rotation about separate median axes. In this case the sliding bolts associated with one of said sides may be mutually coupled by means of a toothed transmission.

BRIEF DESCRIPTION OF THE DRAWINGS

Three embodiments of the invention are described herein by way of example, with reference to the accompanying drawings in which:

FIG. 2 shows a sectional view of the throttle device of FIG. 1, the section being taken along the section line II—II in FIG. 1 with gap closed;

FIG. 3 shows the section view according to FIG. 2 with gap open;

FIG. 5 shows a vertical sectional view of the throttle device of FIG. 1, the section being along the section line V—V in FIG. 1;

FIG. 6 shows a vertical cross-section through a modified embodiment of a throttle device in accordance with the present invention.

FIG. 7 shows a horizontal sectional view of the modified embodiment of FIG. 6, the section taken along the section line VII—VII in FIG. 6 with the gap closed;

FIG. 8 shows the sectional view according to FIG. 7 with gap open; and

DESCRIPTION OF THE PREFERRED EMBODIMENTS

Figure 1:
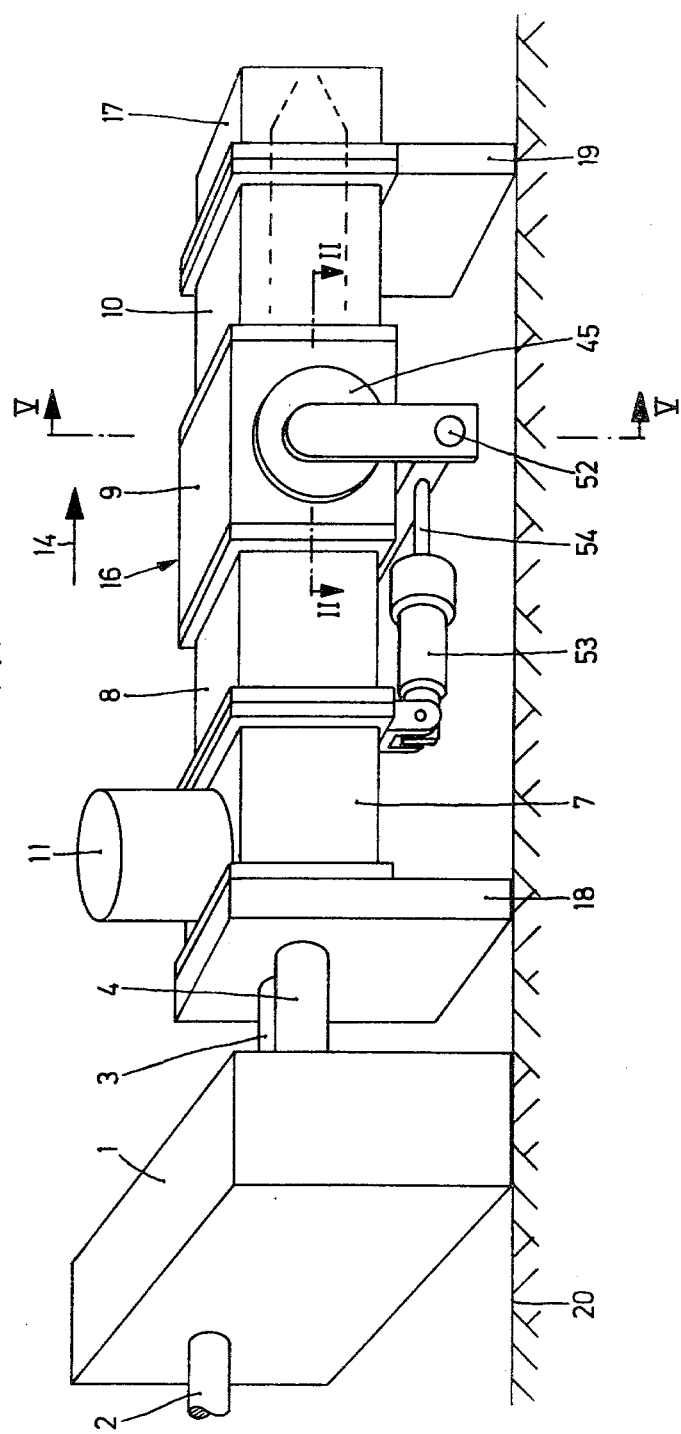
FIG. 1 shows a perspective general view of a screw machine with throttle device according to the present invention.

As FIG. 1 clearly shows, a twin-shafted screw machine has a gearbox 1, the input shaft 2 of which is driven by a drive motor, not shown. The gearbox 1, constructed as a distributor gear, has two output shafts 3, 4 which are connected integrally in rotation and in alignment with two screw shafts 5, 6 (see FIGS. 2 and 3) of the twin-shafted screw machine.

The actual screw housing is constituted by a plurality of housing sections 7, 8, 9, 10 secured together in series through abutting flanges. A feed pipe 11 for charging the material to be treated is mounted on the first housing section 7. The so-called induction zone of the machine is in the region of this first housing section. In this region, screw bushings provided in customary manner with screw flights 12, as may be seen in FIGS. 2 and 3, are fitted on the screw shafts 5, 6. In the next housing section 8 in the feed direction 14 there is provided a kneading zone, in which kneading elements 15 constructed as discs, such as are known from German Pat. No. 940,109 (corresponding to U.S. Pat. No. 2,814,472) are secured integrally in rotation on the relevant screw shaft 5, 6.

In the next housing section 9 there is constructed a throttle device 16, which will be described in greater detail hereinbelow. In the following housing section 10, screw bushing 13 provided with screw flights 12 are again fitted on the screw shafts 5. This region of the machine serves as an homogenisation zone for the material being treated. This last housing section 10 is adjoined by an extruder head 17. The housing of the screw machine, built up in this way, is braced through the intermediary of a support plate 18 confronting the gearbox 1 and a bracing plate 19 attached to the region of the extruder head 17, and supported on a foundation bed 20 upon which the gearbox 1 is also braced.

Figure 4:
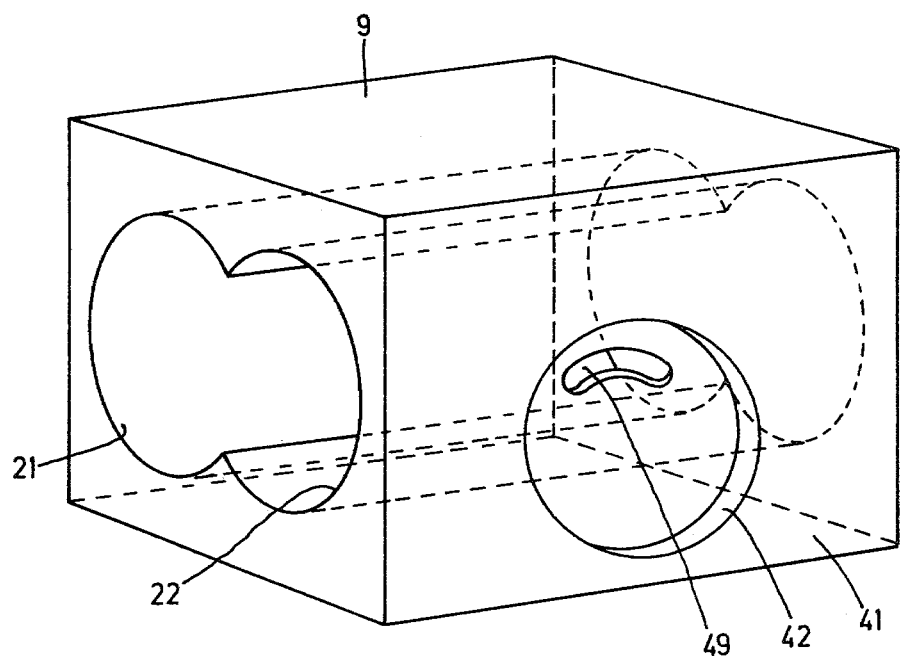
FIG. 4 shows the housing section of the throttle device.

Through the individual housing sections 7 to 10 there extend two housing bores 21, 22 oriented concentrically to the screw shafts 5, 6 which bores—as may be seen particularly from FIG. 4—penetrate each other so that the relevant screw flights 12 and kneading elements 15 of the two screw shafts 5, 6 engage and mesh with each other, as will be clear particularly from FIGS. 2 and 3.

In the throttle device 16 there are mounted on the two screw shafts 5, 6, for rotation therewith, inner gap sleeves 23, 24 which are of substantially cylindrical construction. Each of said gap sleeves is preceded, counter to the feed direction 14, by a cylindrical section 25, 26 which has a definitely smaller diameter than the relevant gap sleeve 23, 24. Between each of the upstream kneading elements 15 and the respective downstream cylindrical sections 25, 26, a frusto-conical transition section 27 is fitted on the corresponding screw shaft 5, 6. Considered in the feed direction 14, the relevant inner gap sleeve 23, 24 is in turn adjoined by a relaxation section 28 tapering in the feed direction 14, between which and the following screw bushings 13 frusto-conical transition section 29 is again provided.

Also provided in the throttle device 16, each respectively associated with a respective screw shaft 5, 6, are outer gap sleeves 30, 31 which surround respectively the cylindrical section 25 or 26 and—depending upon the operational state—may also surround the inner gap sleeve 23 or 24. The external diameter of the gap sleeves 30 and 31 is smaller than the diameter of the housing bores 21 and 22 only by the necessary design play, so that the outer gap sleeves 30, 31 abut the wall of the housing bores 21 22 virtually tightly, but still slidably axially in the feed direction 14 and counter to the feed direction 14. Because the housing bores 21, 22 penetrate each other, the outer gap sleeves 30, 31, which otherwise have a circular cylindrical external circumference, must be provided each with a secant-shaped flattening 32, 33 which are in mutual contact in the penetration plane of the two housing bores 21, 22, as FIG. 5 particularly shows. Said mutually contacting flattenings 32, 33 serve simultaneously to prevent rotation of the outer gap sleeves 30, 31 mutually with respect to the housing section 9.

The outer gap sleeves 30, 31 each have a cylindrical internal bore 34, 35, the diameter of which is only slightly greater than the external diameter of the internal gap sleeves 23 and 24. Due this fact, when as shown in FIG. 2 the relevant outer gap sleeve 30, 31 has been slid in the axial direction partly or totally over the associated inner gap sleeve 23, 24, a gap 36, 37 is formed between said sleeves, the width of which is generally only a few tenths of a millimeter. Depending on how far the outer gap sleeve 30 or 31 has been slid over the inner gap sleeve 23 or 24, an axial length the relevant gap 36 or 37 is obtained, the maximum length of which corresponds to the axial length of the inner gap sleeve 23 or 24. This limit position is illustrated in FIG. 2, whereas FIG. 3 shows the totally open position in which the relevant outer gap sleeve 30, 31 surrounds only the associated cylindrical section 25, 26 i.e., is withdrawn totally from the inner gap sleeve 23, 24. Due to the diametral propositions already stated hereinbefore, an annular channel 38, 39 through which the material to be treated can flow practically unthrottled is formed between the relevant inner bore 34, 35 and corresponding outer gap sleeves 30, 31 and the corresponding cylindrical section 25 and 26.

The adjustment of the outer gap sleeves 30, 31 is achieved as follows: In each of the lateral walls 40, 41 of the housing section 9 there is constructed an annular cylindrical disc-shaped depression, which has a common median axis 43. In each depression 42 there is mounted a cylindrical disc 44, 45 serving as pivot bearing, which as eccentrically the median axis 43 a sliding bolt 46 or 47 which penetrates through a correspondingly adapted annular cylindrical-section shaped slot 48 or 49 into the corresponding recesses 50, 51 in the outer gap sleeves 30, 31. Said recesses 50, 51 are constructed as vertically oriented grooves, because in the case of a rotary movement of the relevant discs 44 and 45 about the median axis 43 in the relevant depression 42, the sliding bolts 46, 47 execute not only a horizontal movement in the transport direction 14 or counter thereto, but also a vertical movement. The sliding bolts 46 and 47 are therefore located substantially without axial play in the recesses 50, 51, but they have the necessary play at right angles thereto.

The discs 44, 45 are attached to a rocker arm 52 which is constructed as a U-shaped stirrup which extends round the underside of the housing section 9. Said rocker arm 52 is connected through a piston rod 54 to a hydraulic work cylinder 53, which is stationary, e.g. articulated to the housing of the machine, so that when the work cylinder 53 is appropriately loaded with a pressurized medium, the piston rod 54 by retracting or extending pivots the rocker arm 52 and hence the discs 44, 45. By this pivotal movement, the outer gap sleeves, 30 31 are then slid each in the same direction to form or cancel a gap 36, 37 or to modify its gap length.

As FIG. 5 clearly shows, cooling channels 55 surrounding the housing bores 21, 22 axially parallel may, of course, also be provided in the housing section 9. In the embodiment according to FIGS. 1 to 5, the individual housing sections 7 to 10 are not divided in the horizontal median plane. Because the housing bores 21, 22 have the same diameter continuously over the entire length of the machine, the screw shafts can be inserted as a unit into the continuous housing bores 21, 22 after the assembly of the screw bushings 13, of the kneading elements 15, of the inner gap sleeves 23, 24 with the cylindrical sections 25, 26 etc., and after the assembly of the outer gap sleeves 30, 31.

The embodiment according to FIGS. 6 to 8 differs from that previously described principally in that the outer gap sleeves 30', 31' are slid mutually oppositely. In a corresponding manner, the inner gap sleeves 23', 24' are arranged in mutual mirror image relationship, i.e., on the one screw shaft 5 the cylindrical section 25' and the inner gap sleeve 23' are arranged in the same sequence as in the embodiment according to FIGS. 1 to 5, whereupon the other screw shaft 6, considered in the feed direction 14, the inner gap sleeve 24' is arranged first and then the cylindrical section 26'. Otherwise the construction in this embodiment is substantially the same as the embodiment previously described, so that the same reference numerals can be used for the same parts without fresh explanation.

The movement of the outer gap sleeves 30, 31 in the opposite directions is effected by means of cylindrical discs 44', 45', which are constructed in corresponding depressions 42' in the top side 56 and in the underside 57 of the housing section 9, which in this case is divided in the horizontal plane common to the housing bores 21, 22 into an upper housing half 9'a and a lower housing half 9'b. The discs 44', 45' are pivotable about a common vertical median axis 58 which passes through the common penetration plane of the housing bore 21, 22 formed by the flattened parts 32', 33'. Here again, the common pivoting of said discs 44', 45' is effected by a rocker arm 52' which itself is moved by operation of a work cylinder 53' through its piston rod 54'.

On its side confronting the housing bores 21', 22, each disc 44', 45' has at an equal interval from the vertical median axis 58, two sliding bolts 46'a, 46'b, and 47'a, 47'b. Said sliding bolts engage into corresponding recesses 50'a, 50'b and 51'a, 51'b in the outer gap sleeves 30' and 31' respectively.

Here again the sliding bolts engage through corresponding slots 48'a, 48'b and 49'a, 49'b into the housing bores 21, 22. Again in this embodiment, the discs 44', 45' serve not only as pivot bearings, but also simultaneously as a tight cover for the slots. Upon a pivoting of the rocker arm 52', the sliding bolts 46'a, 46'b and 47'a, 47'b fitted to each disc 44' 45' are moved in mutually opposite directions relative to the feed direction 14, so that the two out gap sleeves 30' and 31' are also moved simultaneously in mutually opposite directions. Because each outer gap sleeve 30' and 31' is engaged by two sliding bolts 46'a and 47'a on the one hand and 46'b and 47'b, an extraordinarily carefree guidance of the outer gap sleeves 30', 31 is ensured. Here again cooling channels 55' are provided.

Figure 9:
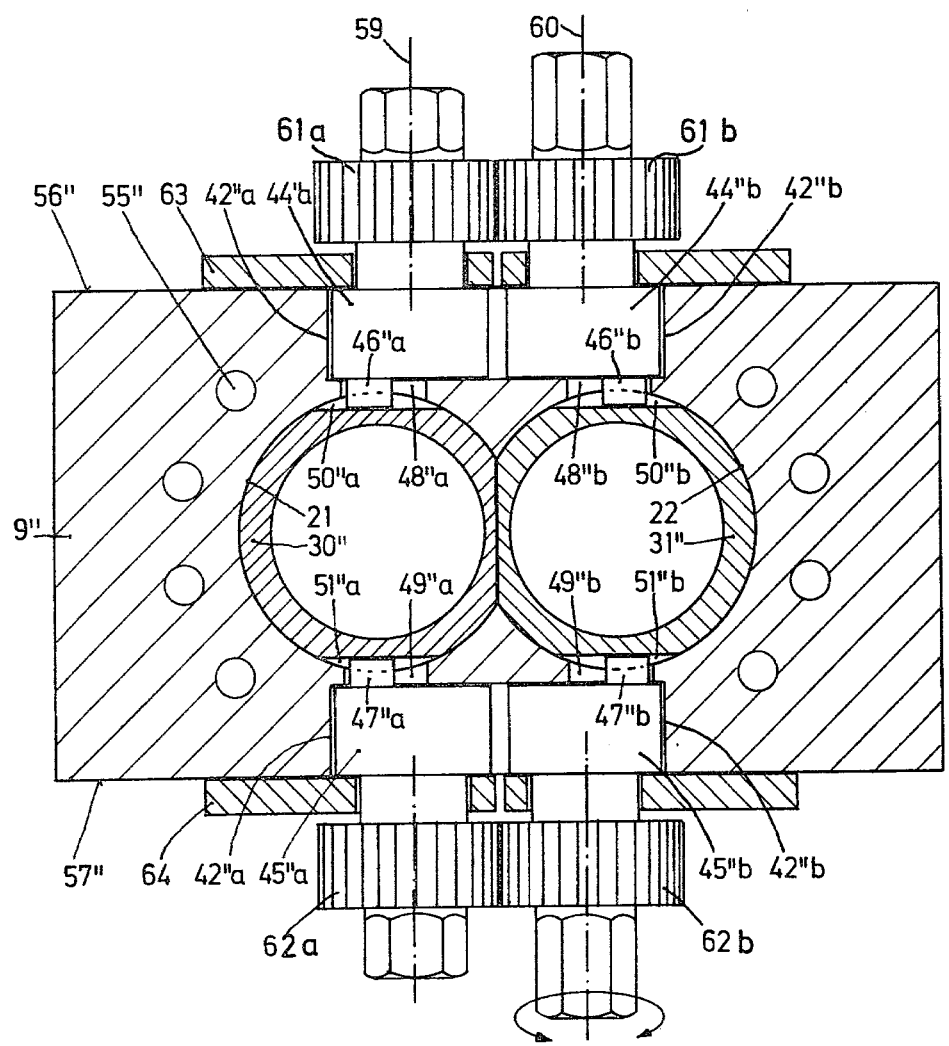
FIG. 9 shows a vertical cross-sectional view through a third embodiment of a throttle device according to the present invention.

In the embodiment according to FIG. 9, sliding of the outer gap sleeves 30" and 31" in the same direction is once more effected. For this purpose there are formed in the relevant top side 56" and underside 57" of the corresponding housing section 9", two cylindrical disc-shaped depressions 42"a, 42"b, in which corresponding discs 44"a, 44"b and 45"a, 45"b are mounted in the manner already described. Again there is fitted to each a sliding bolt 46"a, 46"b or 47"a, 47"b, each of which engages through a corresponding slot 48"a, 48"b or 49"a, 49"b into the associated housing bore 21 or 22. The outer gap sleeves 30", 31" contain corresponding recesses 50"a, 50"b, and 51"a, 51"b respectively, into which the corresponding sliding bolts 46"a, 46"b, or 47"a, 47"b engage in the manner already described.

The discs 44"a and 45"a or 44"b and 45"b respectively, which are associated with an outer gap sleeve 30" or 31", are pivotable about a common vertical median axis 59 or 60 respectively, to which the respectively associated sliding bolts are arranged eccentrically. The discs 44"b and 45"b associated with an outer gap sleeve 31" are again mutually coupled through a rocker arm, not shown. The two discs 44"a and 44"b, and the two discs 45"a and 45"b associated with the underside 57", are respectively mutually coupled by two toothed pinions 61a and 61b or 62a and 62b of equal diameter and engaging mutually with equal tooth systems, so that upon a rotary drive of the one disc 45"b, and through the rocker arm of the disc 44"b from a drive unit not shown, the respectively coupled disc 45"a or 44"a is entrained with equal speed and with rotary angle, but in the opposite direction of rotation in each case.

By this mode of construction the outer gap sleeves 30" and 31" are again slid in the same direction, whilst simultaneously the application of sliding force occurs from two mutually opposite sides. Here again cooling channels 55" are provided in the housing section 9". It is simultaneously indicated how the discs 44"a, 44"b, 45"a and 45"b are retained on the top side 56" or underside 57* of the housing section 9" by means of bearing covers 63, 64.

What is claimed is:

1. In a throttle device for a twin-shaped screw machine having a housing with two mutually penetrating housing bores in which respective screw shafts having mutually meshing screw elements are arranged, each of the housing bores having an outer gap sleeve substantially tightly abutting a wall thereof and each of the screw shafts having an operatively associated inner gap sleeve, the improvement wherein said inner and outer gap sleeves are mutually axially displaceable in order to provide or to modify a gap therebetween for throttling the material to be processed, said outer gap sleeves being guided to prevent relative rotation therebetween, wherein each said gap is formed between a circular cylindrical outer circumference on a corresponding one of said inner gap sleeves and a circular cylindrical internal bore on a corresponding one of said outer gap sleeves so that each said gap comprises an annular cylindrical gap of constant width and of variable length, each said outer gap sleeve being connected to at least one sliding bolt which extends through an associated slot in said housing and is movable from the exterior of said housing.

2. An improved device according to claim 1, wherein said sliding bolts associated with said outer gap sleeves are mutually kinematically coupled.

3. An improved device according to claim 1 or claim 2, wherein each said sliding bolt is attached to a respective disc which also masks said associated slot.

4. An improved device according to claim 3, wherein said sliding bolts are mounted pivotably on said housing and are arranged eccentrically to respective pivotal axes.

5. An improved device according to claim 4, wherein said discs are of circular cylindrical construction and are mounted in corresponding depressions in said housing.

6. An improved device according to claim 4, wherein respective ones of said sliding bolts which penetrate an associated lateral wall of said housing is associated with each of said outer gap sleeves.

7. An improved device according to claim 4, wherein two mutually opposite of said sliding bolts penetrating a top side and an underside of said housing respectively are associated with each of said outer gap sleeves.

8. An improved device according to claim 7, wherein two of said sliding bolts penetrating said top side of said housing on the one hand and two of said sliding bolts penetrating said underside of said housing on the other hand are coupled mutually integrally in rotation and pivotable about a common median axis in each case.

9. An improved device according to claim 7, wherein two of said sliding bolts penetrating said top side of said housing on the one hand and said two sliding bolts penetrating said underside of the housing on the other hand are pivotable in mutually opposite directions of rotation separate median axes in each case.

10. An improved device according to claim 9, wherein said sliding bolts associated with one of said sides are mutually coupled by means of a toothed transmission.

11. An improved device according to claim 3, wherein said discs are of circular cylindrical construction and are mounted in corresponding depressions in said housing.

12. An improved device according to claim 2, wherein said sliding bolts are mutually coupled via at least one rocker arm.

13. An improved device according to claim 1 or claim 2, wherein said sliding bolts are mounted pivotably on said housing and are arranged eccentrically to respective pivotal axes.

* * * * *